No. 748,759. PATENTED JAN. 5, 1904.
F. M. LEAVITT.
AUTOMOBILE TORPEDO.
APPLICATION FILED OCT. 6, 1902.
NO MODEL. 6 SHEETS—SHEET 1.

INVENTOR:
Frank M. Leavitt,
By Attorneys,

WITNESSES:

No. 748,759. PATENTED JAN. 5, 1904.
F. M. LEAVITT.
AUTOMOBILE TORPEDO.
APPLICATION FILED OCT. 6, 1902.
NO MODEL. 6 SHEETS—SHEET 2.

WITNESSES:
Rene Prunne
Fred White

INVENTOR:
Frank M. Leavitt,
By Attorneys,
Arthur C. Fraser & Co

No. 748,759. PATENTED JAN. 5, 1904.
F. M. LEAVITT.
AUTOMOBILE TORPEDO.
APPLICATION FILED OCT. 6, 1902.
NO MODEL. 6 SHEETS—SHEET 3.

WITNESSES:
René Bruine
Fred White

INVENTOR:
Frank M. Leavitt,
By Attorneys,

No. 748,759. PATENTED JAN. 5, 1904.
F. M. LEAVITT.
AUTOMOBILE TORPEDO.
APPLICATION FILED OCT. 6, 1902.
NO MODEL. 6 SHEETS—SHEET 5.

FIG. 6.

WITNESSES:

INVENTOR
Frank M. Leavitt,

By Attorneys,

No. 748,759.

PATENTED JAN. 5, 1904.

F. M. LEAVITT.
AUTOMOBILE TORPEDO.
APPLICATION FILED OCT. 6, 1902.

NO MODEL.

WITNESSES:
René Bruine
Fred White

INVENTOR:
Frank M. Leavitt,

By Attorneys,

No. 748,759.  Patented January 5, 1904.

UNITED STATES PATENT OFFICE.

FRANK M. LEAVITT, OF BROOKLYN, NEW YORK, ASSIGNOR TO E. W. BLISS COMPANY, OF BROOKLYN, NEW YORK, A CORPORATION OF WEST VIRGINIA.

AUTOMOBILE TORPEDO.

SPECIFICATION forming part of Letters Patent No. 748,759, dated January 5, 1904.

Application filed October 6, 1902. Serial No. 126,067. (No model.)

*To all whom it may concern:*

Be it known that I, FRANK M. LEAVITT, a citizen of the United States, residing in the borough of Brooklyn, county of Kings, city and State of New York, have invented certain new and useful Improvements in Automobile Torpedoes, of which the following is a specification.

This invention relates to means for propelling automobile torpedoes of the type wherein a fluid under pressure is employed to drive an engine or motor, which in turn drives the propeller screw or screws. The well-known Whitehead torpedo is a typical example. In this torpedo compressed air stored in a reservoir, from which it is liberated through the medium of a reducing-valve, is employed to drive a three-cylinder engine, which directly turns the shaft on which one screw is mounted and from which through bevel-gears the other screw is rotated in the contrary direction. The exhaust-air is discharged through the hollow screw-shaft and escapes at the stern or tail of the torpedo. A retarding-gear is required to throttle the admission of compressed air to the engine at launching in order to prevent racing of the engine before the torpedo enters the water, this gear being adapted to admit full pressure to the engine after the latter has made a number of turns corresponding to a duration of time sufficient to insure its submergence.

My invention aims to provide a more simple, durable, and efficient driving means which shall be as free as possible from vibration and wherein the propulsive strains are simple and are taken up in the most direct manner. To these ends my invention provides a fluid-pressure turbine as the motor, connecting it by gearing or other simple manner to the screw or screws. Preferably the turbine is arranged to turn on an axis longitudinally of the torpedo and preferably coincident with the longitudinal axis of the torpedo. Preferably, also, it is connected to the screw or screws by gearing, so that the screws shall be driven at a lower speed than that of the turbine. To equalize the propulsive strain or torque and enable the turbine to turn with the minimum friction, the transmission therefrom is effected through two or more gears symmetrically arranged around the axis of the turbine and symmetrically engaging the screw-shaft. For driving twin screws it is preferable to drive from the turbine a main shaft carrying or engaging the first screw and from this shaft to drive the second screw through miter-gears, as heretofore.

I will proceed to describe in detail the preferred embodiment of my invention with reference to the accompanying drawings, wherein—

Figure 1:
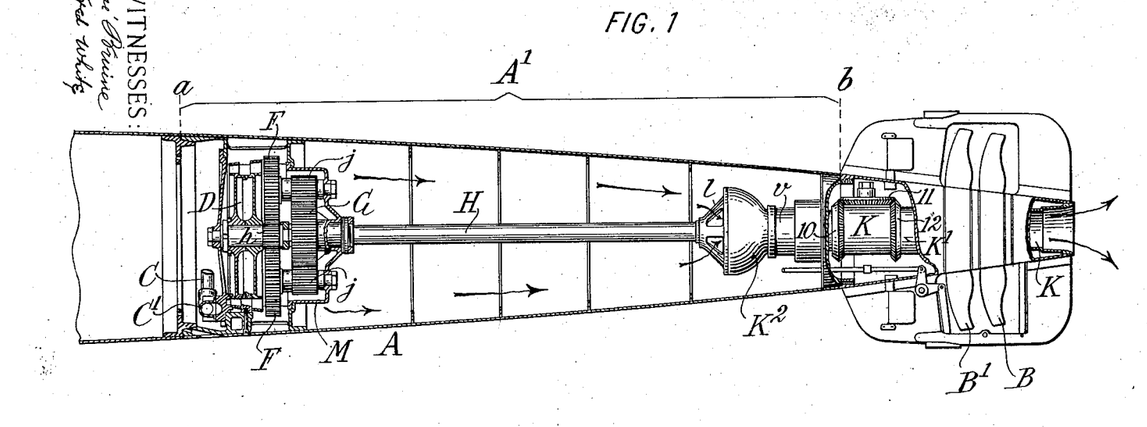
Figure 1 is a longitudinal section of the aft part of a torpedo fitted with my invention, the internal mechanism being mainly shown in elevation.

Referring to the drawings, let A designate the shell of the torpedo, which may, except in the respects herein described, be understood to be an ordinary Whitehead torpedo. I have not herein shown the main or midship section of the torpedo which contains the air flask or reservoir of compressed air, nor have I shown the starting-lever or pressure-reducing valve, as these parts are all well understood. If desired, reference may be had to my Patent No. 693,872, dated February 25, 1902, which shows these several parts. The hull or shell of the Whitehead torpedo is constructed in sections, that section which in Fig. 1 extends from the division a to the division b being known as the "after-body," here lettered A', and that astern of b, being known as the "tail," carrying the usual propeller-screws, B B'.

Figure 7:
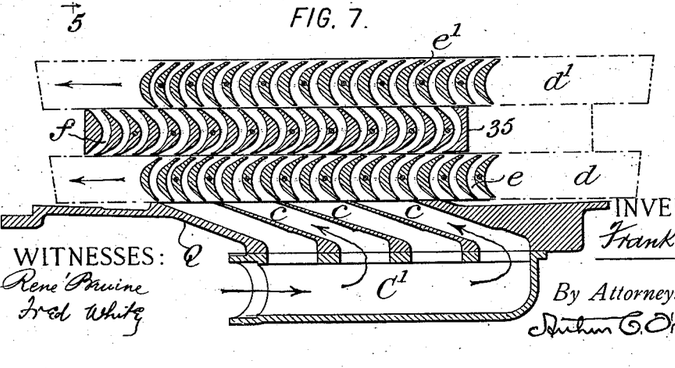
Fig. 7 is a section through the turbine-nozzles and buckets cut approximately in the plane of the line 7 7 in Fig. 3.

Let C designate a pipe conveying compressed air or other fluid under pressure by which such fluid is conducted to the inlet C', leading to nozzles c c, Fig. 7, of the turbine.

Figure 3:
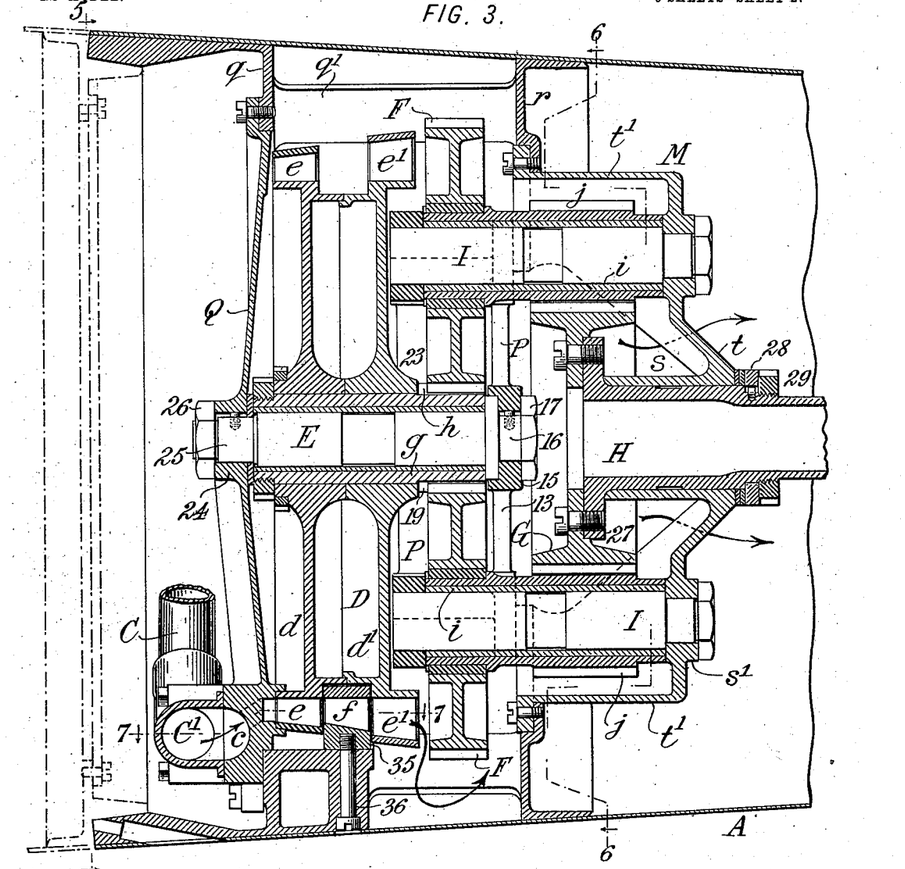
Fig. 3 is a vertical longitudinal mid-section of the turbine and reducing-gears, being the part shown at the left in Fig. 1.

D is the turbine proper, which may be of any ordinary construction of fluid-pressure turbine, being in this instance shown as constructed of two wheels or disks $d\ d'$, the forward wheel, $d$, having teeth or turbine-buckets $e\ e$, receiving the blasts of air from the nozzles $c\ c$ and discharging the expanding air against fixed buckets $f$, fastened in the space between the peripheral portions of the disks $d\ d'$, as shown in Figs. 3 and 7. From these fixed buckets the expanding air is received by the buckets of the second disk, $d'$, from which the expanded air is exhausted freely into the cavity or chamber within the shell of the torpedo. The turbine D is fixed on a sleeve or hub $g$, which turns on a fixed stud E. The hub $g$ is formed with teeth $h$, constituting a pinion meshing with the teeth of two (or more) gear-wheels F F, arranged on diametrically opposite sides of the axis of the turbine, (or otherwise symmetrically around the pinion $h$.) The gears F F are fixed, respectively, on sleeves or hubs $i\ i$, which turn on fixed studs I I. On the sleeves $i\ i$ are fixed pinions $j\ j$, (preferably by forming their teeth integrally with the sleeves,) and these pinions $j\ j$ mesh with a gear G, which is fastened on the forward end of a shaft H, which extends aft, preferably in the axial center of the torpedo, and its rear end engages or is coupled to the tubular shaft K, on which is fixed the propeller-screw B. The screw B' is fixed on a tubular shaft K', surrounding the shaft K, and driven from it in the contrary direction through miter-gears 10, 11, and 12, as in the ordinary Whitehead torpedo.

It is apparent that when the fluid-pressure is admitted through the pipe C to the nozzles $c\ c$ its impingement upon the turbine-buckets will cause the turbine to rapidly revolve, and through the gearing $h$ F F $j\ j$ G the shaft H is driven at a slower speed and in turn drives the screw B at its own speed and the screw B' at a like speed in the contrary direction. It is desirable to gear down between the turbine and screws, since for efficiency the turbine should revolve at a higher speed than the highest speed at which the screws can efficiently turn. Preferably the screws are made with a pitch similar to that of those of the Whitehead torpedo, and the speed reduction is sufficient to drive them at a speed which may be approximately the same as that in the Whitehead torpedo or which may be increased within certain limits, a speed of twelve hundred to fourteen hundred revolutions being probably the maximum that is desirable. The proportions of gearing shown in the drawings are such that the screws make one turn to about five turns of the turbine, this being considered the preferable proportion, although it may be considerably departed from.

Figure 4:
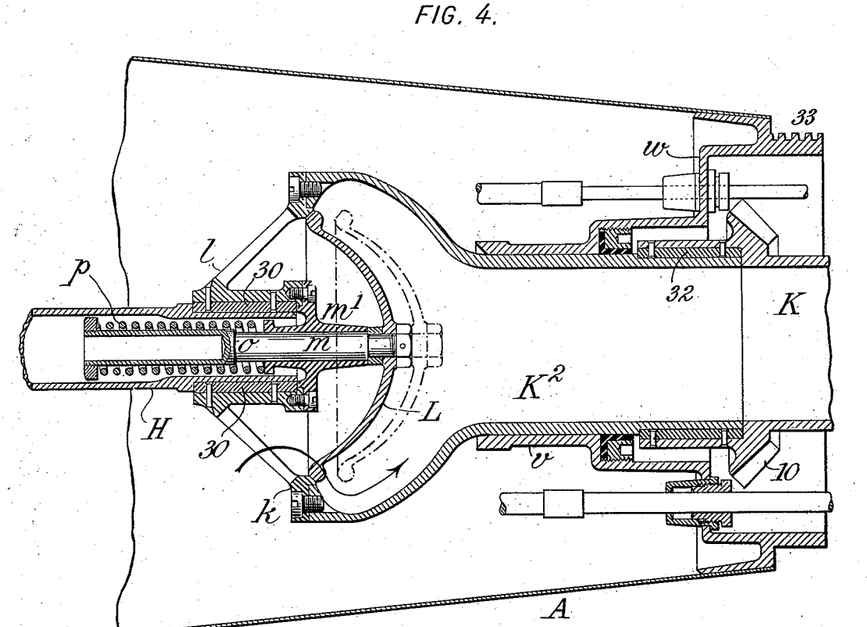
Fig. 4 is a similar section of the parts contained within the rear portion of the after-body.

Instead of providing the turbine with its own casing, as is customary in the construction of steam-turbines, I utilize in part the torpedo-shell for inclosing the turbine and discharge the exhaust directly into this shell. The course of the exhaust is shown by arrows in Figs. 3 and 4 and in Fig. 1. The exhaust-air is finally discharged from the torpedo through the hollow shaft K in order that it may be discharged at the stern and aft of the screws, as in the Whitehead torpedo. It is within my invention in its broadest aspects to discharge the air otherwise; but this mode is preferable. In order to prevent the return flow of water through the shaft K at the end of the run, which would reduce the buoyancy of the torpedo, I provide a check-valve which opens to permit the exhaust to escape and is thereupon closed by a spring, so that it prevents the ingress of water. This valve is preferably constructed and located as shown in Fig. 4, where it closes the entrance to the enlarged or trumpet-shaped end of a pipe or hollow shaft $K^2$, which forms a forward extension of the tubular shaft K. A valve L seats within this trumpet-mouth against a ring or flange $k$ therein, which is united by a spider or cone $l$ to the rear end of the shaft H. The valve L is mounted on a stem $m$, which slides freely in a sleeve $m'$, fixed on the hub of the spider $l$, and this stem is acted on by a spring $p$, which is conveniently coiled around it and confined between a head or nut on the forward end of the stem and the shoulder formed by the front face of the sleeve $m'$. When the exhaust discharged into the torpedo-shell acquires sufficient pressure to overcome the light spring $p$, it forces open the valve L to the position shown in dotted lines in Fig. 4, in which position the valve is arrested by a stop-shoulder $o$ on the stem $m$ striking the sleeve $m'$. The air then flows past the valve, as indicated by the arrow in Fig. 4. At the end of the run, or when the air ceases to exhaust through the turbine and its pressure falls, the valve is closed by the spring $p$, so that water entering the hollow shaft K cannot flow into the air-space within the hull.

Some preferable details of construction will now be described.

Figure 2:
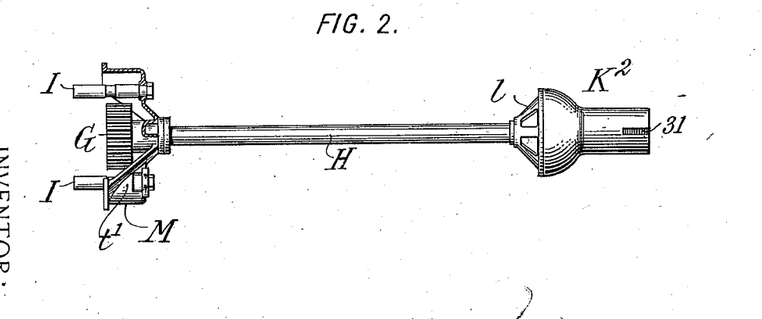
Fig. 2 is an elevation of part of the internal mechanism, including the main screw propelling-shaft and its immediate connections.
Figure 8:
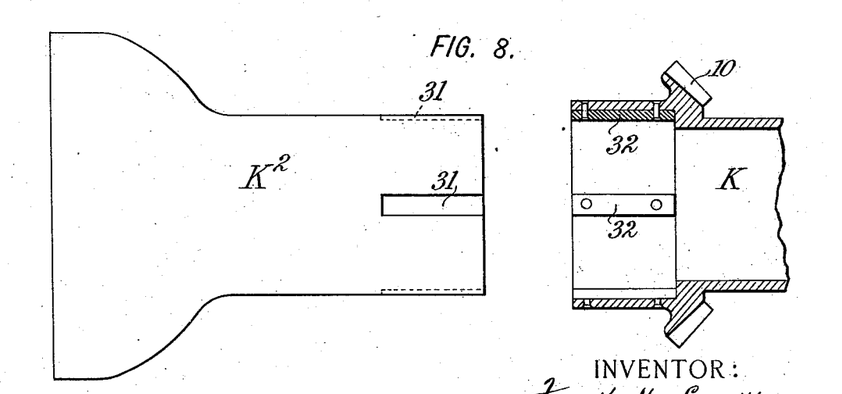
Fig. 8 is an elevation of the coupling or connection between two sections of the propeller-shaft.
Figures 9, 10:
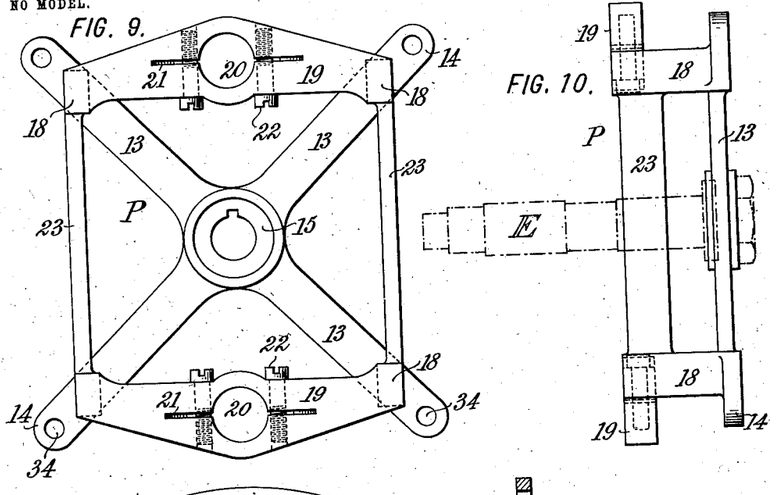
Figs. 9 and 10 are a front and side elevation of the frame or spider inclosing the gears.
Figure 11:
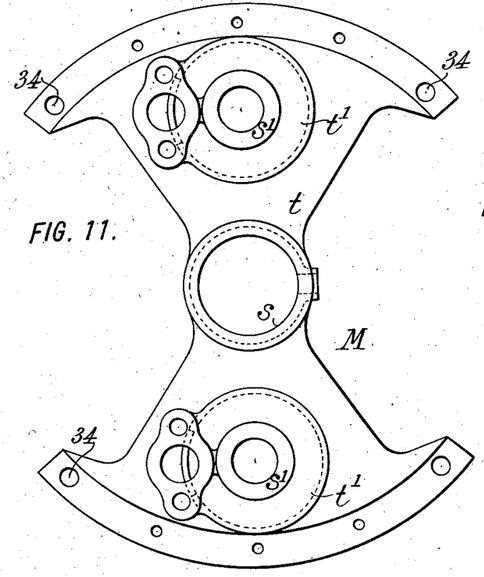
Figs. 11 and 12 are respectively a rear elevation and side elevation, partly in section, of another supporting-frame.
Figure 12:
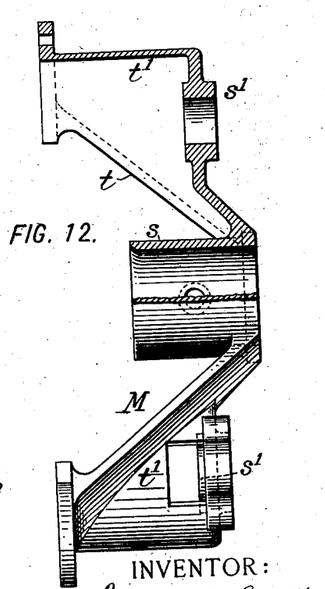

In order to provide a strong but light mounting for the turbine and gears, the torpedo-shell A is provided with internal stiffening-rings $q$ and $r$, which are preferably tied together at intervals by tie-bars $q'$. The ring $r$ is flanged at its inner periphery to receive a flange on a bearing shell or bracket M, preferably constructed in the manner shown in Figs. 11 and 12. This shell M has a central hub or sleeve s, which forms a bearing for the rear end of the shaft H. (See Fig. 3.) It also has hubs or bosses s' s', to which are fastened the studs I I, which project thence forwardly, as shown in Fig. 2. The central hub s and outer bosses s' s' are connected by a web or shell t, which is conical except at t' t', where it is made cylindrical to inclose the pinions j j. The conical web t is cut away at opposite sides to afford ample passages for the outflow of air from the turbine. For supporting the front ends of the studs I I and the rear end of the stud E, I provide a frame P, which is shown separately in Figs. 9 and 10. This frame is preferably constructed with cross-arms 13 13 at the rear, connecting ears 14 14, which are fastened by screws to the ring r, with a central hub 15, to which is fastened the rear end of the stud E, the latter having a contracted neck 16, which passes through the hub 15 and is screw-threaded to receive a nut 17, by which the stud is clamped in place, being prevented from turning by a pin or key set in the neck 16 and entering a notch or keyway in the hub. The stud E is shown in place in dotted lines in Fig. 10. Projecting forwardly from the four arms 13 are four posts or bars 18 18, the two upper bars being connected at their front ends by a yoke 19 and the two lower bars being connected by a like yoke 19. The yokes 19 are formed with holes 20 for receiving the front ends of the studs I I. The yokes are also split at 21 and provided with tightening-screws 22, whereby their split portions may be drawn together to tightly clamp the studs I I. To securely connect the yokes and prevent the studs I I being forced apart by the thrust transmitted through the gears, the opposite ends of these yokes are connected by vertical tie-bars 23, which prevent the gears from spreading or getting out of mesh. The front end of the stud E is supported by a disk or head Q, the outer flange of which is fastened by screws to the ring q, its center being formed with a hub 24, which receives a neck 25 on the stud E, the latter being tightly connected by a nut 26, screwing on its threaded end. The disk Q serves as an air-tight partition, separating the engine-chamber in its rear from the chamber in front of it. The nozzles c c are shown as formed integrally with the disk or plate Q, although this is not necessary. The shaft H is formed at its front end with a flange 27, to which the web of gear-wheel G is fastened by screws. A separable collar 28 is fastened on the shaft to engage the rear of the bearing-sleeve s, being held in place by a screw ring or nut 29. The rear end of the shaft H is connected to the spider l by means of keyways formed in the shaft and keys 30 riveted in place within the hub of l, so that the shaft H may be slid into or out of engagement with the spider l. The ring k of this spider is fastened by screws to the flared end of the tubular shaft K². This latter is connected to the tubular shaft K by similar keyways and keys, as shown in Fig. 8, where 31 31 are keyways in the shaft-section K² and 32 32 are keys riveted into grooves in the shaft-section K, so that the shaft-sections can be engaged or disengaged by a longitudinally-sliding movement. The tubular shaft K has bearings as heretofore in the tail of the torpedo, while to support the shaft-section K², and through it the rear end of the shaft H, a sleeve v, Fig. 4, is formed as a forward projection from the usual ring or partition piece w, which latter has mutilated screw-threads 33 for uniting the tail.

Figure 5:
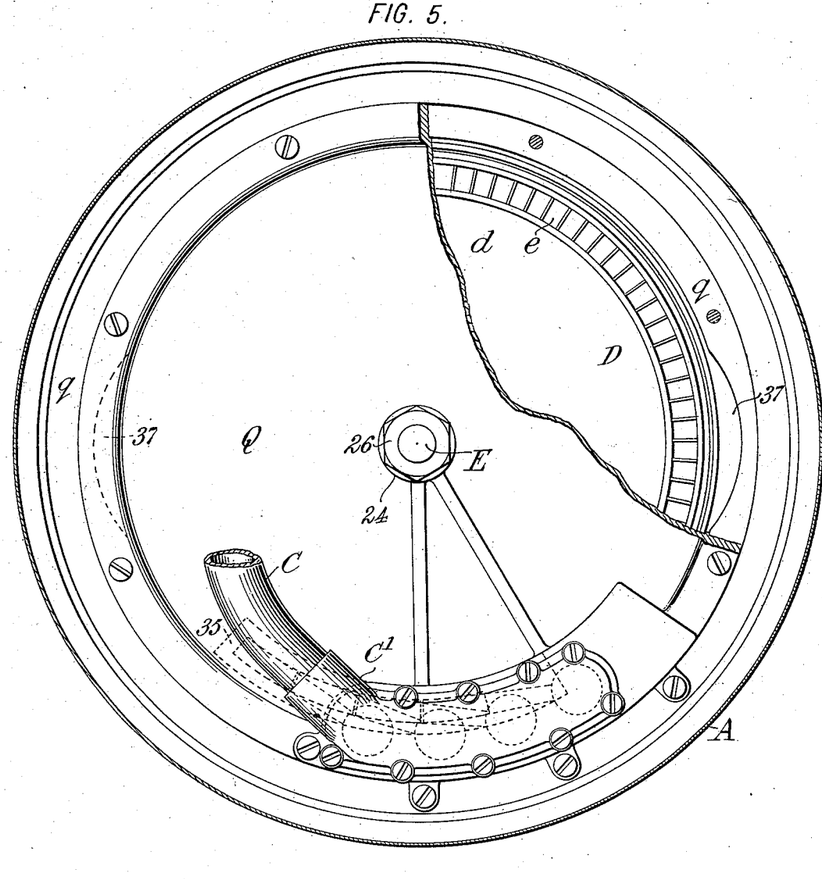
Fig. 5 is a transverse section of the torpedo on the line 5 5 in Fig. 3 looking aft.
Figure 6:
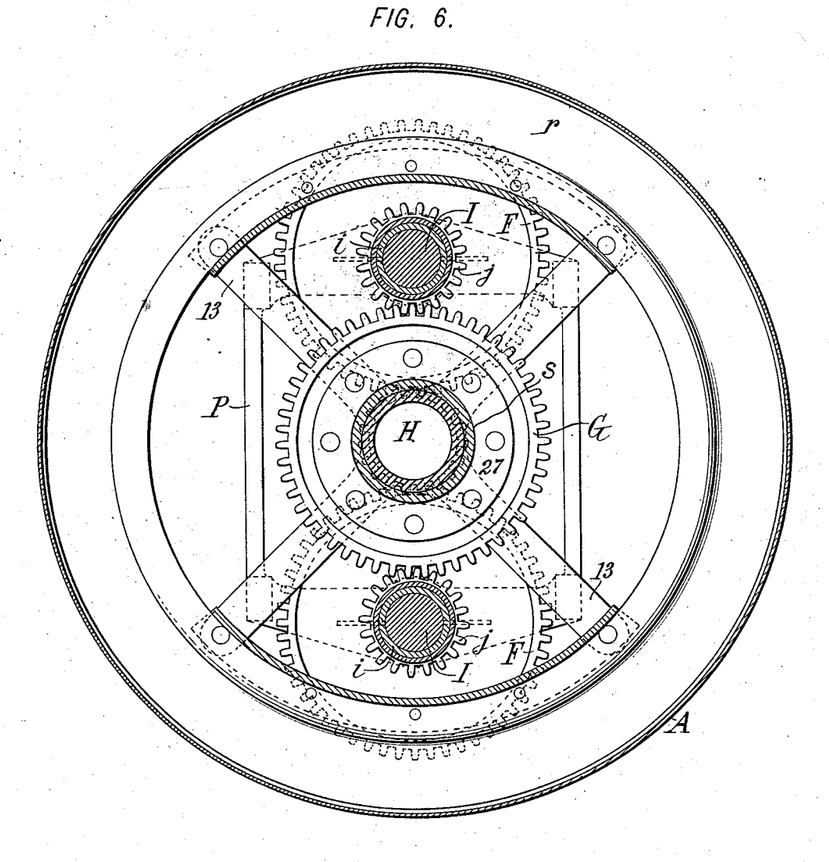
Fig. 6 is a transverse section on the line 6 6 in Fig. 3 looking forward.

The several parts thus described are especially designed and adapted for convenient assembling and insertion within the confined space afforded by the torpedo-hull. The operations of assembling are as follows: The shaft H, having fastened upon it the gear G, is passed rearwardly through the hub s of the frame M and its collar 28 and screw-ring 29 are applied. The studs I I are fastened in place in the hubs s' of the frame M. The valve L, spider l, stem m, spring p, and sleeve m' are united in obvious manner, and the seating-ring k is then fastened by screws to the shaft-section K², whereupon the rear end of the shaft H is entered into the hub of the spider l, so that the shaft H and connected parts appear as in Fig. 2. The stud E being then fastened to the frame P, Fig. 10, the gears F, with their sleeves i and pinions j, are entered loosely into approximately their correct positions in this frame, and the frame is then applied to the frame M, in so doing sliding the sleeves i onto the studs I, with the pinions j in mesh with the gear G. The yokes 19 are then engaged with the ends of the studs I I and their clamping-screws 22 tightened. This temporarily unites the frames P and M and the other parts named. These several parts thus united are then entered into the after-body A' (which at this time is disconnected from the other sections of the torpedo-hull) by inserting them through the rings q and r and guiding the end of the shaft-section K² into the bearing-sleeve v. As the gears F F project beyond the normal opening in the ring q, this opening is enlarged at 37 37, Fig. 5, on opposite sides, so that by turning the interior parts to bring the gears F F into coincidence with the arc-shaped notches 37 the parts can be entered, after which the parts are turned to bring them to their final position. On bringing the frame M into its proper place against the ring r screws are inserted through its flange into this ring, four screws being inserted through the coinciding holes 34 34, Figs. 9 and 11, in the frames P M, whereby the several parts are fastened securely in place. The block 35, in which are formed the stationary buckets f, is then placed between the buckets e e' of the turbine D, (the parts of this turbine having been previously united on their sleeve g.) The turbine is passed within the ring $q$ and onto the stud E, whereupon the block 35 is guided into the correct position and fastened in place by screws 36, one of which is shown in Fig. 3. In putting the turbine in place the pinion $h$ enters into mesh with the gears F F. The disk or head Q is then put in place and fastened by screws through its peripheral flange and by screwing on the central nut 26. Finally, the air-inlet C', previously united to the air-inlet pipe C, is fastened by screws to the isk Q.

My turbine-motor mechanism for automobile torpedoes has important practical advantages over the fluid-expansion engines heretofore used, being much simpler, having about ten per cent. greater efficiency, being free from vibration and noise except only the slight noise inseparable from the use of gearing, having no dead-center, being subject to no severe shocks or strains, and being of far superior durability. This latter feature is of great practical importance, it being well known that in the Whitehead torpedo the engine has to be rebuilt usually after forty shots or practice runs and even after about twenty runs requiring ordinarily to be refitted by the rebushing of bearings and readjustment of parts. My turbine-motor being free from shocks or violent strains by taking up within its own framework the direct strains to which it is alone subject will continue in perfect condition for considerably over one hundred shots or runs and, in fact, until its wearing surfaces or bearings are so worn down as to require renewal. Another important advantage of my motor is that it requires no retarding-gear to prevent racing of the screws during launching, since the turbine speeds up so gradually that it does not reach full speed until about the time the torpedo enters the water, so that no racing can occur.

What I claim is—

1. A torpedo comprising a compressed-air reservoir, a reducing-valve, a turbine-motor, and a screw, with an outflow-conduit from said reservoir through said valve to the inlet-nozzle of said turbine, and means for communicating rotation from said turbine to said screw.

2. A torpedo comprising a compressed-air reservoir, a reducing-valve, a turbine-motor, and axial twin screws arranged tandem, with an outflow-conduit from said reservoir through said valve to the inlet-nozzle of said turbine, and reducing-gearing interposed between said turbine and screws for driving the screws in opposite directions.

3. A fluid-pressure-propelled torpedo having a turbine-motor for driving its screw, and interposed gearing symmetrically arranged to equalize the thrust or torque imparted by the turbine.

4. A fluid-pressure-propelled torpedo having a turbine-motor turning on an axis longitudinally of the torpedo, and reducing-gears turning on axes parallel therewith and arranged symmetrically for communicating its rotation to the screw-shaft.

5. A fluid-pressure-propelled torpedo having a turbine-motor turning on an axis longitudinally of the torpedo, a pinion fixed to said turbine, reducing-gears meshing therewith and turning on axes parallel to said axis and having pinions fixed to them, an axial screw-shaft, and a gear-wheel thereon meshing with said pinions, said reducing-gears being disposed symmetrically around the central axis.

6. A fluid-pressure-propelled torpedo having a turbine-motor for driving its screw, and bearing-frames for the turbine and screw-shaft adapted to be entered within the torpedo-shell and to be fastened to strengthening-rings therein.

7. A fluid-pressure-propelled torpedo having a turbine-motor turning on an axis longitudinally of the torpedo and connected to drive its screw, a central screw-shaft, a bearing for the after end thereof, a bearing frame or bracket for the forward end thereof, studs carried by said frame, and reducing-gears turning on said studs for communicating the rotation of the turbine to said shaft, whereby said gears, shaft and frame may be simultaneously entered into the torpedo-shell.

8. In a torpedo having a turbine-motor and a central screw-shaft, a frame carrying parallel studs, reducing-gears and pinions turning on said studs, a central stud connected at one end to said frame on which turns the turbine, and a disk supporting the other end of said stud and fastened within the torpedo-shell.

9. In a torpedo having a turbine-motor and a central screw-shaft, a frame M having a central bearing for said screw-shaft, studs I I supported by said frame, a second frame supporting the opposite ends of said studs, and reducing-gears turning on said studs.

10. In a torpedo having a turbine-motor and a central screw-shaft, a frame M having a central bearing for said screw-shaft, studs I I supported by said frame, a second frame P, a central stud E carried by said frame, reducing-gears turning on the studs I I, and a turbine turning on the stud E.

11. In a torpedo having a turbine-motor and a central screw-shaft, studs I I, reducing-gears turning thereon, and a frame P having yokes engaging said studs and having ties uniting said yokes.

12. In a torpedo having a turbine-motor and a central screw-shaft, studs I I, reducing-gears turning thereon, a central stud E on which the turbine turns, and a frame P having a central hub for supporting said stud E and yokes for supporting said studs I I.

13. In a torpedo having a turbine-motor, studs I I, reducing-gears turning thereon, and a frame connecting said studs having yokes engaging the studs and means for clamping said yokes to the studs.

14. In a torpedo having a turbine-motor and a central screw-shaft, the combination of the torpedo-shell A, rings $r$ $q$ therein, frame M fitting into said ring $r$ and forming a bearing for the screw-shaft, and disk Q fitting into said ring $q$ and supporting a stud on which the turbine turns.

15. In a torpedo having a turbine-motor, the combination of the shell A, a ring $q$ therein, a disk Q fastened to said ring $q$, means for supporting the turbine aft of said disk, and means for admitting fluid-pressure through said disk to drive the turbine.

16. In a torpedo having a turbine-motor, the combination of the torpedo-shell A, a partition dividing it, the turbine located aft of said partition, and means for supporting the turbine whereby the torpedo-shell aft of said partition serves as a chamber for the turbine, the turbine being arranged to exhaust into said chamber.

17. A torpedo having a turbine-motor exhausting into the hollow hull of the torpedo, and a discharge-passage for conveying the exhaust therefrom to the tail of the torpedo.

18. A torpedo having a turbine-motor, and a self-closing valve through which the exhaust from the turbine escapes from the torpedo adapted to prevent entrance of water into the torpedo.

19. A torpedo having a turbine-motor exhausting into the hollow hull of the torpedo, a discharge-passage for conveying the exhaust therefrom through the tail of the torpedo, and a self-closing valve in said passage.

20. A torpedo having a turbine-motor and a central tubular screw-shaft, the latter arranged to serve as a discharge-passage for the exhaust from the turbine, and a self-closing valve mounted within said shaft.

21. A torpedo having a turbine-motor and a central screw-shaft, the aft portion of said shaft being tubular and having a trumpet-mouth, openings for admitting exhaust fluid from within the torpedo-hull into said trumpet-mouth to flow through said hollow shaft and escape at the torpedo-tail, and a self-closing valve in said trumpet-mouth for preventing ingress of water.

22. A torpedo having a turbine-motor and a central screw-shaft, the latter formed with a tubular section K mounted in the tail-section of the torpedo, a tubular section $K^2$ mounted in the after-body, and a main shaft H engaging said section $K^2$ and having a bearing in the after-body, and driven at its forward end by the turbine.

In witness whereof I have hereunto signed my name in the presence of two subscribing witnesses.

FRANK M. LEAVITT.

Witnesses:
 ARTHUR C. FRASER,
 FRED WHITE.